US009564634B2

(12) United States Patent
Yamamoto et al.

(10) Patent No.: US 9,564,634 B2
(45) Date of Patent: Feb. 7, 2017

(54) POSITIVE ELECTRODE ACTIVE SUBSTANCE PARTICLES AND PROCESS FOR PRODUCING THE SAME, AND NON-AQUEOUS ELECTROLYTE SECONDARY BATTERY

(71) Applicant: TODA KOGYO CORP., Hiroshima-shi, Hiroshima-ken (JP)

(72) Inventors: Manabu Yamamoto, Sanyo Onoda (JP); Daisuke Nishikawa, Sanyo Onoda (JP); Taisei Inoue, Sanyo Onoda (JP); Osamu Sasaki, Sanyo Onoda (JP); Hideaki Sadamura, Sanyo Onoda (JP)

(73) Assignee: TODA KOGYO CORPORATION, Hiroshima (JP)

( * ) Notice: Subject to any disclaimer, the term of this patent is extended or adjusted under 35 U.S.C. 154(b) by 0 days.

(21) Appl. No.: 14/388,931

(22) PCT Filed: Mar. 14, 2013

(86) PCT No.: PCT/JP2013/057151
§ 371 (c)(1),
(2) Date: Sep. 29, 2014

(87) PCT Pub. No.: WO2013/146287
PCT Pub. Date: Oct. 3, 2013

(65) Prior Publication Data
US 2015/0060725 A1 Mar. 5, 2015

(30) Foreign Application Priority Data
Mar. 30, 2012 (JP) .................. 2012-82386

(51) Int. Cl.
*H01M 4/88* (2006.01)
*H01M 4/505* (2010.01)
*H01M 4/525* (2010.01)
*C01G 51/00* (2006.01)
*C01G 53/00* (2006.01)
*H01M 10/052* (2010.01)
*H01M 4/02* (2006.01)

(52) U.S. Cl.
CPC .............. *H01M 4/505* (2013.01); *C01G 51/50* (2013.01); *C01G 51/56* (2013.01); *C01G 53/006* (2013.01); *C01G 53/50* (2013.01); *C01G 53/56* (2013.01); *H01M 4/525* (2013.01); *H01M 10/052* (2013.01); *C01P 2002/50* (2013.01); *C01P 2002/52* (2013.01); *C01P 2002/76* (2013.01); *C01P 2004/03* (2013.01); *C01P 2004/50* (2013.01); *C01P 2004/61* (2013.01); *C01P 2006/11* (2013.01); *C01P 2006/12* (2013.01); *C01P 2006/80* (2013.01); *H01M 2004/021* (2013.01); *H01M 2004/028* (2013.01); *Y02E 60/122* (2013.01); *Y02P 70/54* (2015.11)

(58) Field of Classification Search
CPC .......... H01M 4/485; H01M 4/52; H01M 4/58; H01M 4/505; H01M 4/131
USPC ....... 252/182.1; 429/231.95, 223, 231.3, 206
See application file for complete search history.

(56) References Cited

U.S. PATENT DOCUMENTS

| 2004/0091779 A1 | 5/2004 | Kang et al. |
| 2006/0083989 A1* | 4/2006 | Suhara ................ C01G 53/006 429/231.3 |
| 2009/0104530 A1* | 4/2009 | Shizuka ............... H01M 4/505 429/223 |
| 2009/0280412 A1 | 11/2009 | Imanari et al. |
| 2010/0104944 A1 | 4/2010 | Saito et al. |
| 2011/0003200 A1* | 1/2011 | Shizuka ............... H01M 4/131 429/206 |
| 2011/0052990 A1 | 3/2011 | Yanagida et al. |
| 2012/0217435 A1 | 8/2012 | Yamamoto et al. |
| 2013/0045421 A1 | 2/2013 | Kobino et al. |
| 2014/0045068 A1 | 2/2014 | Yamamoto et al. |

FOREIGN PATENT DOCUMENTS

| EP | 1 391 950 A1 | 2/2004 |
| EP | 2 062 858 | 5/2009 |
| EP | 2 693 535 | 2/2014 |
| JP | 2006-278322 | * 10/2006 .............. H01M 4/02 |
| JP | 2006331943 A | * 12/2006 |

(Continued)

OTHER PUBLICATIONS

Machine translation of JP2006331943, 2015.*

(Continued)

*Primary Examiner* — Khanh Tuan Nguyen
(74) *Attorney, Agent, or Firm* — Nixon & Vanderhye P.C.

(57) ABSTRACT

The present invention relates to positive electrode active substance particles comprising a compound having at least a crystal system belonging to a space group of R-3m and a crystal system belonging to a space group of C2/m, the positive electrode active substance particles having a specific intensity ratio; a content of Mn in the positive electrode active substance particles being controlled such that a molar ratio of Mn/(Ni+Co+Mn) therein is not less than 0.55; and the positive electrode active substance particles comprising an element A (that is at least one element selected from the group consisting of Si, Zr and Y) in an amount of 0.03 to 5% by weight and having a tap density of 0.8 to 2.4 g/cc and a compressed density of 2.0 to 3.1 g/cc. The positive electrode active substance particles can be produced by calcining a mixture of precursor particles comprising the element A, Mn, Ni and/or Co, and a lithium compound.

11 Claims, No Drawings

(56) References Cited

FOREIGN PATENT DOCUMENTS

| JP | 2008-084766 | * | 4/2008 | ............. H01M 4/58 |
|----|----|----|----|----|
| JP | 2008-098154 | | 4/2008 | |
| JP | 2011-029000 | | 2/2011 | |
| JP | 2011-071090 | | 4/2011 | |
| JP | 2011-105588 | | 6/2011 | |
| KR | 2005-087912 | * | 9/2005 | ........ H01M 10/0525 |
| WO | WO 2002/086993 | | 10/2002 | |
| WO | WO 2008/081839 | | 7/2008 | |
| WO | WO 2011/040383 | | 4/2011 | |
| WO | WO 2012/133113 | | 10/2012 | |

OTHER PUBLICATIONS

International Preliminary Examination Report in PCT/JP2013/057151 dated Oct. 9, 2014.

International Search Report for PCT/JP2013/057151, mailed May 28, 2013.

Extended European Search Report issued in Application No. 13767403.2 dated Oct. 19, 2015.

\* cited by examiner

POSITIVE ELECTRODE ACTIVE SUBSTANCE PARTICLES AND PROCESS FOR PRODUCING THE SAME, AND NON-AQUEOUS ELECTROLYTE SECONDARY BATTERY

This application is the U.S. national phase of International Application No. PCT/JP2013/057151 filed 14 Mar. 2013 which designated the U.S. and claims priority to JP Patent Application No. 2012-82386 filed 30 Mar. 2012, the entire contents of each of which are hereby incorporated by reference.

TECHNICAL FIELD

The present invention relates to positive electrode (cathode) active substance particles for non-aqueous electrolyte secondary batteries which are excellent in discharge capacity.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Also, in consideration of global environments, electric cars and hybrid cars have been recently developed and put into practice, so that there is an increasing demand for lithium ion secondary batteries used in large size applications which have excellent storage characteristics. Under these circumstances, the lithium ion secondary batteries having advantages such as large charge/discharge capacities have been noticed.

Hitherto, as positive electrode active substances useful for high energy-type lithium ion secondary batteries exhibiting a 4 v-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary batteries using these active substances, lithium ion secondary batteries using $LiNiO_2$ have been noticed because of large charge/discharge capacities thereof. However, in the case where the secondary batteries are used in a movable body requiring a large energy such as electric cars, these materials tend to be still insufficient in discharge capacity, and, therefore, it has been required to further improve properties thereof.

In recent years, it has been found that a positive electrode active substance comprising $Li_2MnO_3$ belonging to a space group of C2/m and having a higher capacity exhibits a large discharge capacity (Patent Literature 1).

With respect to the above material, there have also been made various studies on enhancement of a discharge capacity and a rate characteristic thereof. It has been reported that the properties of the material is improved by additives (Patent Literature 2), a heat treatment method (Patent Literature 3), a method of trapping gases generated upon charging (Patent Literature 4), a method of modifying properties of the surface of the particles (Patent Literature 5), etc. However, these conventional methods tend to be still insufficient.

CITATION LISTS

Patent Literature

Patent Literature 1: Japanese Patent Application Laid-open (KOKAI) No. 9-55211 (1997)
Patent Literature 2: Japanese Patent Application Laid-open (KOKAI) No. 2010-251189
Patent Literature 3: Japanese Patent Application Laid-open (KOKAI) No. 2011-29000
Patent Literature 4: Japanese Patent Application Laid-open (KOKAI) No. 2010-277790
Patent Literature 5: Japanese Patent Application Laid-open (KOKAI) No. 2011-96626

SUMMARY OF INVENTION

Problem to be Solved by the Invention

At present, it has been strongly required to provide a positive electrode active substance for non-aqueous electrolyte secondary batteries which is excellent in discharge capacity. However, the positive electrode active substance capable of fully satisfying the above requirement has not been obtained until now.

In particular, in the application field of electric cars, etc., there is a strong demand for secondary batteries having a large capacity.

In consequence, an object of the present invention is to provide positive electrode active substance particles for non-aqueous electrolyte secondary batteries which have a large discharge capacity, a process for producing the positive electrode active substance particles, and a non-aqueous electrolyte secondary battery comprising a positive electrode comprising the positive electrode active substance particles.

Mean for Solving the Problem

That is, according to the present invention, there are provided positive electrode active substance particles comprising a compound having at least a crystal system belonging to a space group of R-3m and a crystal system belonging to a space group of C2/m, the compound being in the form of a composite oxide comprising at least Li, Mn, an element A (that is at least one element selected from the group consisting of Si, Zr and Y) and Co and/or Ni;

a relative intensity ratio [(a)/(b)] of a maximum diffraction peak intensity (a) observed at $2\theta=20.8\pm1°$ in a powder X-ray diffraction pattern of the positive electrode active substance particles as measured using a Cu—Kα ray to a maximum diffraction peak intensity (b) observed at $2\theta=18.6\pm1°$ in the powder X-ray diffraction pattern being 0.02 to 0.2;

a content of Mn in the positive electrode active substance particles being controlled such that a molar ratio of Mn/(Ni+Co+Mn) therein is not less than 0.55; and the positive electrode active substance particles comprising the element A in an amount of 0.03 to 5% by weight and having a tap density of 0.8 to 2.4 g/cc and a compressed density of 2.0 to 3.1 g/cc (Invention 1).

Also, according to the present invention, there are provided the positive electrode active substance particles as described in the above Invention 1, wherein the positive electrode active substance particles comprise $LiM_xMn_{1-x}O_2$ wherein M is Ni and/or Co; $0<x\cdot1$, as the compound having a crystal system belonging to a space group of R-3m, and $Li_2M'_{(1-y)}Mn_yO_3$ wherein M' is Ni and/or Co; $0<y\cdot1$, as the compound having a crystal system belonging to a space group of C2/m (Invention 2).

Also, according to the present invention, there are provided the positive electrode active substance particles as described in the above Invention 1 or 2, wherein a molar ratio of Li/(Ni+Co+Mn) in the positive electrode active substance particles is 1.25 to 1.7 (Invention 3).

Also, according to the present invention, there are provided the positive electrode active substance particles as described in any one of the above Inventions 1 to 3, wherein the positive electrode active substance particles have a specific surface area of 0.1 to 20 m$^2$/g as measured by a BET method (Invention 4).

Also, according to the present invention, there are provided the positive electrode active substance particles as described in any one of the above Inventions 1 to 4, wherein the positive electrode active substance particles are in the form of secondary particles produced by aggregating primary particles thereof in which the secondary particles have an average secondary particle diameter of 1 to 50 μm (Invention 5).

In addition, according to the present invention, there are provided precursor particles of the positive electrode active substance particles as described in any one of the above Inventions 1 to 5, comprising a composite hydroxide or a composite carbonate as a main component which comprises at least Mn, an element A (that is at least one element selected from the group consisting of Si, Zr and Y) and Co and/or Ni, a content of Mn in the precursor particles being controlled such that a molar ratio of Mn/(Ni+Co+Mn) therein is not less than 0.55; and the precursor particles comprising the element A in an amount of 0.025 to 5.5% by weight and having an average secondary particle diameter of 1 to 50 μm (Invention 6).

Further, according to the present invention, there is provided a process for producing the positive electrode active substance particles as described in any one of the above Inventions 1 to 5, comprising the step of calcining a mixture comprising the precursor particles as described in the above Invention 6, and a lithium compound at a temperature of 500 to 1500° C. (Invention 7).

Furthermore, according to the present invention, there is provided a non-aqueous electrolyte secondary battery using a positive electrode comprising the positive electrode active substance particles as described in any one of the above Inventions 1 to 5 (Invention 8).

Effect of the Invention

The positive electrode active substance particles according to the present invention can exhibit a large discharge capacity and can provide a high energy, and therefore can be suitably used as positive electrode active substance particles for non-aqueous electrolyte secondary batteries.

PREFERRED EMBODIMENTS FOR CARRYING OUT THE INVENTION

The construction of the present invention is described in more detail below.

The positive electrode active substance particles according to the present invention comprise a compound having at least a crystal system belonging to a space group of R-3m and a crystal system belonging to a space group of C2/m, and are in the form of a compound that comprises a composite oxide comprising at least Li, Mn, and Co and/or Ni, and an element A (at least one element selected from the group consisting of Si, Zr and Y).

The compound having a crystal system belonging to a space group of R-3m preferably includes those compounds represented by the formula: $LiM_xMn_{1-x}O_2$ wherein M is Ni and/or Co; $0<x·1$. Specific examples of the preferred $LiM_xMn_{1-x}O_2$ include $LiCo_xMn_{1-x}O_2$, $LiNi_xMn_{1-x}O_2$, and $Li(Ni, Co)_xMn_{1-x}O_2$.

Meanwhile, the numerical character "3" of the above space group of "R-3 m" is actually indicated with a "macron", i.e., expressed by "3̄", but the symbol of the space group is conveniently expressed herein merely by "R-3 m".

The compound having a crystal system belonging to a space group of C2/m preferably includes those compounds represented by the formula: $Li_2M'_{(1-y)}Mn_yO_3$ wherein M' is Ni and/or Co; $0<y·1$.

When the positive electrode active substance particles according to the present invention are subjected to a powder X-ray diffraction analysis using a Cu—Kα ray as a radiation source, one peak inherent to $LiM_xMn_{1-x}O_2$ as the compound having a crystal system belonging to a space group of R-3m is observed at 2θ=18.6±1° in the powder diffraction pattern, whereas another peak inherent to $Li_2M'_{(1-y)}Mn_yO_3$ as the compound having a crystal system belonging to a space group of C2/m is observed at 2θ=20.8±1° in the powder diffraction pattern.

In the positive electrode active substance particles according to the present invention, the relative intensity ratio of a maximum diffraction peak intensity (a) observed at 2θ=20.8±1° in the powder X-ray diffraction pattern to a maximum diffraction peak intensity (b) observed at 2θ=18.6±1° in the powder X-ray diffraction pattern [(a)/(b)] is 0.02 to 0.2. When the relative intensity ratio [(a)/(b)] is less than 0.02, the resulting positive electrode active substance particles tend to hardly exhibit sufficient charge/discharge capacities owing to an excessively small amount of the compound having a crystal system belonging to a space group of C2/m. When the relative intensity ratio [(a)/(b)] is more than 0.2, lithium ions in the resulting positive electrode active substance particles tend to be hardly moved smoothly owing to an excessively large amount of the compound having a crystal system belonging to a space group of C2/m, so that the positive electrode active substance particles tend to hardly exhibit sufficient charge/discharge capacities. The relative intensity ratio [(a)/(b)] is preferably 0.02 to 0.15, more preferably 0.02 to 0.12 and still more preferably 0.025 to 0.08.

In the positive electrode active substance particles according to the present invention, the molar ratio of Li to a sum of Ni, Co and Mn [Li/(Ni+Co+Mn)] therein is preferably 1.25 to 1.7. When the molar ratio of Li/(Ni+Co+Mn) is less than 1.25, the resulting positive electrode active substance particles tend to be deteriorated in charge capacity owing to a less content of lithium contributing to charging therein. When the molar ratio of Li/(Ni+Co+Mn) is more than 1.7, the resulting positive electrode active substance particles tend to contrarily suffer from surplus of Li which is no longer incorporated into a crystal structure thereof, or deterioration in discharge capacity because of increase in resistance components owing to the excessively large amount of lithium therein. The molar ratio of Li/(Ni+Co+Mn) in the positive electrode active substance particles is more preferably 1.25 to 1.65, still more preferably 1.3 to 1.6, and even still more preferably 1.35 to 1.55.

In the positive electrode active substance particles according to the present invention, the content of Mn therein is controlled such that a molar ratio of Mn to a sum of Ni, Co and Mn [Mn/(Ni+Co+Mn)] therein is not less than 0.55. When the molar ratio of Mn/(Ni+Co+Mn) is less than 0.55, the compound having a crystal system belonging to a space group of C2/m tends to be hardly formed in a sufficient amount, so that the resulting positive electrode active substance particles tend to be deteriorated in charge/discharge capacities. The molar ratio of Mn/(Ni+Co+Mn) in the positive electrode active substance particles is preferably not less than 0.6 and more preferably not less than 0.65. The upper limit of the molar ratio of Mn/(Ni+Co+Mn) is preferably about 0.8.

In the positive electrode active substance particles according to the present invention, the content of Ni therein is controlled such that a molar ratio of Ni to a sum of Ni, Co and Mn [Ni/(Ni+Co+Mn)] is preferably 0 to 0.45. When the molar ratio of Ni/(Ni+Co+Mn) is more than 0.45, the resulting positive electrode active substance particles tend to be deteriorated in thermal stability. The Ni content (molar ratio of Ni/(Ni+Co+Mn)) in the positive electrode active substance particles is more preferably 0 to 0.35.

In the positive electrode active substance particles according to the present invention, the content of Co therein is controlled such that a molar ratio of Co to a sum of Ni, Co and Mn [Co/(Ni+Co+Mn)] therein is preferably 0 to 0.45. When the molar ratio of Co/(Ni+Co+Mn) is more than 0.45, the resulting positive electrode active substance particles tend to be deteriorated in stability of their structure. The Co content (molar ratio of Co/(Ni+Co+Mn)) in the positive electrode active substance particles is more preferably 0 to 0.35.

The positive electrode active substance particles according to the present invention comprise the element A in an amount of 0.03 to 5% by weight. When the content of the element A in the positive electrode active substance particles is less than 0.03% by weight, the secondary battery produced using the resulting positive electrode active substance particles tends to be hardly improved in charge/discharge rate characteristics owing to a less effect of preventing sintering between the particles when calcined. When the content of the element A in the positive electrode active substance particles is more than 5% by weight, the resulting positive electrode active substance particles tend to be deteriorated in discharge capacity because of increase in resistance components owing to the excessively large amount of the element A. The content of the element A in the positive electrode active substance particles is preferably 0.03 to 2.3% by weight, more preferably 0.1 to 1.05% by weight and still more preferably 0.1 to 0.5% by weight.

The positive electrode active substance particles according to the present invention have a tap density of 0.8 to 2.4 g/cc. When the tap density of the positive electrode active substance particles is less than 0.8 g/cc, the density of primary particles of the resulting positive electrode active substance particles tends to become too coarse, so that it is not possible to sufficiently transfer electrons therethrough, thereby causing deterioration in discharge capacity thereof. When the tap density of the positive electrode active substance particles is more than 2.4 g/cc, the density of primary particles of the resulting positive electrode active substance particles tends to become too dense, so that smooth transfer of electrons therethrough tends to be inhibited, thereby also causing deterioration in discharge capacity thereof. The tap density of the positive electrode active substance particles is preferably 1.0 to 2.3 g/cc, more preferably 1.5 to 2.3 g/cc, and still more preferably 1.8 to 2.3 g/cc.

The positive electrode active substance particles according to the present invention have a compressed density of 2.0 to 3.1 g/cc. When pressing the electrode sheet, the secondary particles tend to be partially collapsed to fill spaces between the particles. When the compressed density of the positive electrode active substance particles is less than 2.0 g/cc, the spaces between primary particles and secondary particles of the resulting positive electrode active substance particles tend to become too coarse, so that it is not possible to sufficiently transfer electrons therethrough, thereby causing deterioration in discharge capacity thereof. When the compressed density of the positive electrode active substance particles is more than 3.1 g/cc, the spaces between primary particles and secondary particles of the resulting positive electrode active substance particles tend to become too dense, so that a contact area of the particles with an electrolyte solution tends to be reduced, and smooth transfer of electrons therethrough tends to be inhibited, thereby causing deterioration in charge/discharge rate characteristics thereof. The compressed density of the positive electrode active substance particles is preferably 2.4 to 3.0 g/cc, more preferably 2.4 to 2.9 g/cc, and still more preferably 2.4 to 2.8 g/cc.

The specific surface area of the positive electrode active substance particles according to the present invention as measured by a BET method is preferably 0.1 to 20 $m^2/g$. When the specific surface area of the positive electrode active substance particles is less than 0.1 $m^2/g$, i.e., when the primary particles thereof are too large, the distance between the center and surface of the respective particles tends to be excessively increased, so that it is not possible to rapidly transfer electrons therethrough, thereby causing deterioration in charge/discharge rate characteristics thereof. When the specific surface area of the positive electrode active substance particles is more than 20 $m^2/g$, the amount of the primary particles that may fail to come into contact with a conductive material tends to be increased owing to the excessively small primary particles, thereby causing deterioration in discharge capacity thereof. The specific surface area of the positive electrode active substance particles is preferably 0.3 to 12 $m^2/g$, more preferably 0.3 to 9 $m^2/g$ and still more preferably 1 to 7 $m^2/g$.

The average secondary particle diameter of the positive electrode active substance particles according to the present invention is 1 to 50 μm. When the average secondary particle diameter of the positive electrode active substance particles is less than 1 μm, the resulting positive electrode active substance particles tend to exhibit an excessively high reactivity with an electrolyte solution owing to excessive increase in contact area with the electrolyte solution, and therefore tend to be deteriorated in stability upon charging. When the average secondary particle diameter of the positive electrode active substance particles is more than 50 μm, the resulting positive electrode tends to exhibit an increased internal resistance and therefore tends to be deteriorated in charge/discharge rate characteristics. The average secondary particle diameter of the positive electrode active substance particles is preferably 2 to 30 μm, more preferably 2 to 20 μm, and still more preferably 2 to 16 μm.

Next, the process for producing the positive electrode active substance particles according to the present invention is described.

The positive electrode active substance particles according to the present invention may be produced by mixing previously prepared precursor particles comprising a transition metal and the element A with a lithium compound, and then calcining the resulting mixture.

The above transition metal-containing precursor particles used in the present invention may be produced by supplying a mixed acid solution comprising a nickel salt, a cobalt salt, a manganese salt, a zirconium salt and a yttrium salt at desired concentrations and a mixed alkali aqueous solution comprising sodium hydroxide, ammonia, sodium carbonate and water glass into a reaction vessel, controlling a pH value of the resulting suspension to 7.5 to 13, circulating the overflowed suspension through a concentration vessel connected to an overflow pipe into the reaction vessel while controlling a concentration rate of the suspension in the concentration vessel, and then reacting the respective components until a concentration of the precursor particles in the suspension in the reaction vessel and a precipitation vessel reaches 0.2 to 15 mol/L. Alternatively, the precursor particles may also be obtained from the overflowed suspension without using the concentration vessel. After completion of the reaction, the resulting product may be subjected to water-washing, drying and pulverization by ordinary methods.

The transition metal-containing precursor particles used in the present invention are constituted of a hydroxide or a carbonate which is synthesized by co-precipitating a solution of the raw materials with a mixed solution comprising the element A. When the precursor particles comprising the element A, Ni, Co and Mn are synthesized by the co-precipitation method, it is possible to more uniformly disperse the element A in the secondary particles thereof.

The zirconium compound used in the present invention is not particularly limited, and various kinds of zirconium compounds may be used in the present invention. Examples of the zirconium compound include various soluble zirconium compounds such as zirconium sulfate, zirconium oxynitrate, zirconium oxychloride, zirconium chloride, zirconium acetate and zirconium oxalate.

The yttrium compound used in the present invention is not particularly limited, and various kinds of yttrium compounds may be used in the present invention. Examples of the yttrium compound include various soluble yttrium compounds such as yttrium sulfate, yttrium nitrate, yttrium chloride and yttrium acetate.

The silicon compound used in the present invention is not particularly limited, and various kinds of silicon compounds may be used in the present invention. Examples of the silicon compound include various soluble silicon compounds such as sodium silicate, potassium hexafluorosilicate and ammonium hexafluorosilicate.

In the precursor particles according to the present invention, the content of Mn therein is controlled such that a molar ratio of Mn to a sum of Ni, Co and Mn [Mn/(Ni+Co+Mn)] therein is not less than 0.55. When the molar ratio of Mn/(Ni+Co+Mn) is less than 0.55, the compound having a crystal system belonging to a space group of C2/m tends to be hardly formed in the positive electrode active substance particles produced from the precursor particles in a sufficient amount, so that the resulting positive electrode active substance particles tend to be deteriorated in charge/discharge capacities. The molar ratio of Mn/(Ni+Co+Mn) in the precursor particles is preferably not less than 0.6 and more preferably not less than 0.65. The upper limit of the molar ratio of Mn/(Ni+Co+Mn) in the precursor particles is preferably about 0.8.

In the precursor particles according to the present invention, the content of Ni therein is controlled such that a molar ratio of Ni to a sum of Ni, Co and Mn [Ni/(Ni+Co+Mn)] is preferably 0 to 0.45. When the molar ratio of Ni/(Ni+Co+Mn) is more than 0.45, the positive electrode active substance particles produced from the precursor particles tend to be deteriorated in thermal stability. The Ni content (molar ratio of Ni/(Ni+Co+Mn)) in the precursor particles is more preferably 0 to 0.35.

In the posit precursor particles according to the present invention, the content of Co therein is controlled such that a molar ratio of Co to a sum of Ni, Co and Mn [Co/(Ni+Co+Mn)] therein is preferably 0 to 0.45. When the molar ratio of Co/(Ni+Co+Mn) is more than 0.45, the positive electrode active substance particles produced from the precursor particles tend to be deteriorated in stability of their structure. The Co content (molar ratio of Co/(Ni+Co+Mn)) in the precursor particles is more preferably 0 to 0.35.

The precursor particles according to the present invention comprise the element A in an amount of 0.025 to 5.5% by weight. When the content of the element A in the precursor particles is less than 0.025% by weight, the secondary battery produced using the positive electrode active substance particles produced from the precursor particles tends to be hardly improved in charge/discharge rate characteristics owing to a less effect of preventing sintering between the particles when calcined. When the content of the element A in the precursor particles is more than 5.5% by weight, the positive electrode active substance particles produced from the precursor particles tend to be deteriorated in discharge capacity because of increase in resistance components owing to the excessively large amount of the element A. The content of the element A in the precursor particles is preferably 0.025 to 2.5% by weight, more preferably 0.08 to 1.1% by weight and still more preferably 0.08 to 0.55% by weight.

The average secondary particle diameter of the precursor particles according to the present invention is 1 to 50 μm. When the average secondary particle diameter of the precursor particles is less than 1 μm, the positive electrode active substance particles produced from the precursor particles tend to exhibit an excessively high reactivity with an electrolyte solution owing to excessive increase in contact area with the electrolyte solution, and therefore tend to be deteriorated in stability upon charging. When the average secondary particle diameter of the precursor particles is more than 50 μm, the positive electrode obtained using the positive electrode active substance particles produced from the precursor particles tends to exhibit an increased internal resistance and therefore tends to be deteriorated in charge/discharge rate characteristics. The average secondary particle diameter of the precursor particles is preferably 2 to 30 μm, more preferably 2 to 20 μm, and still more preferably 2 to 16 μm.

The BET specific surface area of the precursor particles according to the present invention is preferably 3 to 400 $m^2/g$.

The lithium compound used in the present invention is not particularly limited, and various lithium salts may be used in the present invention. Examples of the lithium compound include lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate and lithium oxide. Among these lithium compounds, preferred is lithium carbonate. The lithium compound may be mixed with the precursor particles in an amount of 20 to 100% by weight based on the weight of the precursor particles.

In addition, the lithium compound used in the present invention preferably has an average particle diameter of not more than 50 μm and more preferably not more than 30 μm. When the average particle diameter of the lithium compound is more than 50 μm, the lithium compound tends to be hardly uniformly mixed with the precursor particles, so that it may be difficult to obtain composite oxide particles having a good crystallinity.

The mixing treatment of the precursor particles comprising a transition metal and the element A with the lithium compound may be conducted by either a dry method or a wet method as long as they can be uniformly mixed with each other.

The mixing treatment of the precursor particles comprising a transition metal and the element A with the lithium compound may be conducted at one time. Alternatively, the precursor particles comprising a transition metal and the element A may be first mixed with one kind of lithium compound, followed by calcining the obtained mixture, and the resulting calcined product may be mixed with the other kind of lithium compound.

As the process for producing the positive electrode active substance particles according to the present invention, there may be mentioned, for example, a process of dry-mixing the precursor particles comprising a transition metal and the element A with the lithium compound and then calcining the resulting mixture, a process of spraying a slurry comprising the precursor particles comprising a transition metal and the element A and the lithium compound, etc., into a high-temperature container heated to 100 to 400° C. to obtain dry particles and then calcining the thus obtained dry particles, or the like.

The calcination temperature used in the production processes is preferably 500 to 1500° C. When the calcination temperature is less than 500° C., the reaction of Li with Ni, Co and Mn may fail to proceed sufficiently, so that these elements tend to be hardly formed into a composite material thereof, and therefore it is not possible to obtain the positive electrode active substance particles having the aimed compressed density. When the calcination temperature is more than 1500° C., sintering tends to excessively proceed. The calcination temperature is more preferably 700 to 1200° C. and still more preferably 800 to 1050° C. The atmosphere upon the calcination is preferably an oxidative gas atmosphere, and more preferably ordinary atmospheric air. The calcination time is preferably 1 to 30 hr.

In the present invention, it is essentially required that the resulting positive electrode active substance particles comprise a compound comprising at least a crystal system belonging to a space group of R-3m and a crystal system belonging to a space group of C2/m at specific proportions. In order to allow the compound obtained by the calcination to comprise the above two kinds of crystal systems in specific proportions, it may be basically required to prepare the precursor particles whose Mn content is controlled such that the molar ratio of Mn/(Ni+Co+Mn) therein is not less than 0.55 and preferably 0.55 to 0.8. As the method of controlling the molar ratio of Mn/(Ni+Co+Mn) in the precursor particles to the above range, there may be used the method of controlling amounts of the nickel salt, cobalt salt and manganese salt as the raw materials, the method of controlling a pH value of the reaction solution, the method of controlling the reaction solution using a complexing agent such as ammonia, or the like. Meanwhile, the crystal system belonging to a space group of R-3m is derived from the above compound of $LiM_xMn_{1-x}O_2$ whereas the crystal system belonging to a space group of C2/m is derived from the above compound $Li_2M'_{(1-y)}Mn_yO_3$. These compounds are produced at the same time through a series of the production steps, and the proportions therebetween may be basically determined according to the Li and Mn contents in the precursor particles as described above.

In the method of controlling a pH value of the reaction solution, when the pH value of the reaction solution is lowered, there is such a tendency that the peak intensity ratio [(a)/(b)] is decreased, i.e., the amount of $Li_2M'_{(1-y)}Mn_yO_3$ having a crystal system belonging to a space group of C2/m is reduced. On the contrary, when the pH value of the reaction solution is raised, there is such a tendency that the peak intensity ratio [(a)/(b)] is increased, i.e., the amount of $Li_2M'_{(1-y)}Mn_yO_3$ having a crystal system belonging to a space group of C2/m is increased.

In the method of controlling the reaction solution by a complexing agent, when the amount of the complexing agent added to the reaction solution is reduced, there is such a tendency that the peak intensity ratio [(a)/(b)] is decreased, i.e., the amount of $Li_2M'_{(1-y)}Mn_yO_3$ having a crystal system belonging to a space group of C2/m is reduced. On the contrary, when the amount of the complexing agent added to the reaction solution is increased, there is such a tendency that the peak intensity ratio [(a)/(b)] is increased, i.e., the amount of $Li_2M'_{(1-y)}Mn_yO_3$ having a crystal system belonging to a space group of C2/m is increased.

As the complexing agent, there may be used one or more compounds selected from the group consisting of ammonium ion donating substances, hydrazine, ethylenediaminetetraacetic acid, nitrilotriacetic acid, uracil diacetic acid, dimethylglyoxime, dithizone, oxine, acetyl acetone and glycine.

Further, the peak intensity ratio [(a)/(b)] may vary by controlling the calcination conditions. That is, when the calcination temperature is raised, there is such a tendency that the peak intensity ratio [(a)/(b)] is lowered, i.e., the amount of $Li_2M'_{(1-y)}Mn_yO_3$ having a crystal system belonging to a space group of C2/m is reduced. On the contrary, when the calcination temperature is dropped, there is such a tendency that the peak intensity ratio [(a)/(b)] is increased, i.e., the amount of $Li_2M'_{(1-y)}Mn_yO_3$ having a crystal system belonging to a space group of C2/m is increased.

Next, the positive electrode comprising the positive electrode active substance particles according to the present invention is described.

When producing the positive electrode comprising the positive electrode active substance particles according to the present invention, a conducting agent and a binder are added to and mixed with the positive electrode active substance particles by an ordinary method. Examples of the preferred conducting agent include acetylene black, carbon black and graphite. Examples of the preferred binder include polytetrafluoroethylene and polyvinylidene fluoride.

The secondary battery produced by using the positive electrode comprising the positive electrode active substance particles according to the present invention comprises the above positive electrode, a negative electrode and an electrolyte.

Examples of a negative electrode active substance which may be used for production of the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate and lithium borate tetrafluoride in the above solvent.

The secondary battery produced by using the positive electrode comprising the positive electrode active substance particles according to the present invention has a discharge capacity at 0.1 C of not less than 250 mAh/g, preferably not less than 260 mAh/g, more preferably not less than 270 mAh/g and still more preferably not less than 280 mAh/g as measured by the below-mentioned evaluation method. The discharge capacity at 0.1 C of the secondary battery is preferably as high as possible.

The secondary battery produced by using the positive electrode comprising the positive electrode active substance particles according to the present invention has a discharge capacity at 1 C of not less than 210 mAh/g, preferably not less than 220 mAh/g, more preferably not less than 230 mAh/g and still more preferably not less than 240 mAh/g as measured by the below-mentioned evaluation method. The discharge capacity at 1 C of the secondary battery is preferably as high as possible.

<Function>

It is considered by the present inventors that since the element A is well dispersed inside and outside of the positive electrode active substance particles, the particles can be prevented from suffering from excessive sintering when calcined, so that the resulting secondary battery can be enhanced in discharge capacity.

EXAMPLES

Typical examples of the present invention are as follows.

The BET specific surface area was measured by a BET method using nitrogen.

The tap density of the positive electrode active substance particles was determined as follows. That is, a predetermined amount of the positive electrode active substance particles passed through a mesh screen were filled in a measuring cylinder, and then tapped 500 times to measure a bulk density of the particles as a tap density thereof.

The compressed density of the positive electrode active substance particles was determined as follows. That is, a predetermined amount of the positive electrode active substance particles passed through a mesh screen were filled in a highly closed mold like a tablet machine, and then compressed by applying a pressure of 3 t/cm$^2$ thereto to measure a bulk density of the particles as a compressed density thereof.

The contents of lithium, nickel, cobalt, manganese, yttrium, zirconium and silicon constituting the positive electrode active substance particles were determined as follow. That is, the positive electrode active substance particles were dissolved in an acid, and the resulting solution was analyzed by a plasma emission spectroscopic device "ICPS-7500" (manufactured by Shimadzu Seisakusho Co., Ltd.).

The identification of the phase and the measurement of the intensity were carried out by X-ray diffraction analysis. The X-ray diffraction analysis was conducted using an X-ray diffractometer "RINT-2000" manufactured by Rigaku Co., Ltd., (tube: Cu; tube voltage: 40 kV; tube current: 40 mA; step angle: 0.020°; count time: 0.6 s; divergence slit: 1°; scattering slit: 1°; light-receiving slit: 0.30 mm).

The average secondary particle diameter of the particles was determined as follows. That is, the particles were observed using a scanning electron microscope "SEM-EDX" equipped with an energy disperse type X-ray analyzer (manufactured by Hitachi High-Technologies Corp.) to measure diameters thereof and calculate a volume-average value of the measured diameters as the average secondary particle diameter of the particles.

The coin cell produced by using the positive electrode active substance particles was evaluated for charge/discharge characteristics and cycle characteristics.

First, 84% by weight of the composite oxide as a positive electrode active substance, 4% by weight of acetylene black and 4% by weight of a graphite "KS-6" both serving as a conducting material, and 8% by weight of polyvinylidene fluoride dissolved in N-methyl pyrrolidone as a binder, were mixed with each other, and the resulting mixture was applied onto a metallic Al foil and then dried at 150° C. The thus obtained sheets were blanked into 16 mm$\phi$ and then compression-bonded to each other under a pressure of 1 t/cm$^2$, thereby producing an electrode having a thickness of 50 µm and using the thus produced electrode as a positive electrode. A metallic lithium sheet blanked into 16 mm$\phi$ was used as a negative electrode, and 1 mol/L LiPF$_6$ solution of mixed solvent comprising EC and DMC in a volume ratio of 1:2 was used as an electrolyte solution, to thereby produce a coin cell of a CR2032 type.

The initial charge/discharge cycle of the coin cell was conducted as follows. That is, while being kept at 25° C., the coin cell was charged at a current density of 20 mA/g until reaching 4.6 V and then charged at a constant voltage until the current value reached $\frac{1}{100}$, and discharged at a current density of 20 mA/g until reaching 2.0 V. Similarly, in the second and subsequent cycles, the discharge capacity was measured by setting a discharge rate to 0.1 C and 1 C.

Example 1

A closed type reaction vessel was charged with 14 L of water, and an inside of the reaction vessel was maintained at 50° C. while flowing a nitrogen gas therethrough. Further, an Ni sulfate-, Co sulfate- and Mn sulfate-containing mixed aqueous solution and a mixed aqueous solution of sodium carbonate and sodium silicate were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

As a result of subjecting the resulting precursor particles to ICP composition analysis, it was confirmed that the molar ratio of Ni:Co:Mn was 18.7:12.4:68.9 (i.e., the molar ratio of Mn/(Ni+Co+Mn) was 0.689); and the Si content was 0.152% by weight. Further, as a result of observing the precursor particles using a scanning electron microscope (SEM), it was recognized that secondary particles having an average secondary particle diameter of 12.7 µm were formed.

The thus obtained co-precipitated precursor and lithium carbonate particles were weighed and intimately mixed with each other. The resulting mixture was calcined at 880° C. for 5 hr under an air flow using an electric furnace.

As a result of subjecting the resulting positive electrode active substance particles to X-ray diffraction analysis, it was confirmed that the positive electrode active substance particles comprised a crystal system belonging to a space group of R-3m and a crystal system belonging to a space group of C2/m, and had a peak intensity ratio [(a)/(b)] of 0.066.

In addition, as a result of subjecting the resulting positive electrode active substance particles to ICP composition analysis, it was confirmed that the molar ratio of Li/(Ni+Co+Mn) was 1.42; the molar ratio of Ni:Co:Mn was 18.7:12.4:68.9 (i.e., the molar ratio of Mn/(Ni+Co+Mn) was 0.689); the Si content was 0.179% by weight; the tap density was 2.10 g/cc; and the compressed density was 2.55 g/cc. The BET specific surface area of the positive electrode active substance particles as measured by a nitrogen absorption method was 5.52 m$^2$/g. Further, as a result of observing the positive electrode active substance particles using a scanning electron microscope (SEM), it was recognized that secondary particles having an average secondary particle diameter of 12.1 μm were formed.

Example 2

A closed type reaction vessel was charged with 14 L of water, and an inside of the reaction vessel was maintained at 60° C. while flowing a nitrogen gas therethrough. Further, an Ni sulfate-, Co sulfate- and Mn sulfate-containing mixed aqueous solution and a mixed aqueous solution of sodium carbonate, sodium silicate and ammonia were successively added into the reaction vessel while stirring such that the pH value therein was adjusted to 8.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium hydroxide particles were weighed and intimately mixed with each other. The resulting mixture was calcined at 950° C. for 5 hr under an air flow using an electric furnace, thereby obtaining positive electrode active substance particles.

Example 3

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium hydroxide, sodium silicate and ammonia were successively added into the reaction vessel while stirring such that the pH value therein was adjusted to 9.2 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 900° C. for 5 hr under an air flow using an electric furnace.

Example 4

A closed type reaction vessel was charged with 14 L of water, and an inside of the reaction vessel was maintained at 30° C. while flowing a nitrogen gas therethrough. Further, an Ni sulfate-, Co sulfate- and Mn sulfate-containing mixed aqueous solution and a mixed aqueous solution of sodium carbonate and sodium silicate were successively added into the reaction vessel while stirring such that the pH value therein was adjusted to 8.9 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 780° C. for 10 hr under an air flow using an electric furnace, thereby obtaining positive electrode active substance particles.

Example 5

A closed type reaction vessel was charged with 14 L of water, and an inside of the reaction vessel was maintained at 60° C. while flowing a nitrogen gas therethrough. Further, an Ni sulfate-, Co sulfate- and Mn sulfate-containing mixed aqueous solution and a mixed aqueous solution of sodium carbonate, sodium silicate and ammonia were successively added into the reaction vessel while stirring such that the pH value therein was adjusted to 8.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 1080° C. for 5 hr under an air flow using an electric furnace, thereby obtaining positive electrode active substance particles.

Example 6

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium carbonate and sodium silicate were successively added into the reaction vessel while stirring such that the pH value therein was adjusted to 8.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 850° C. for 10 hr under an air flow using an electric furnace, thereby obtaining positive electrode active substance particles.

Example 7

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium hydroxide, sodium silicate and ammonia were successively added into the reaction vessel while stirring such that the pH value therein was adjusted to 9.6 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 880° C. for 5 hr under an air flow using an electric furnace.

Example 8

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium hydroxide, sodium silicate and ammonia were successively added into the reaction vessel while stirring such that the pH value therein was adjusted to 10.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 700° C. for 15 hr under an air flow using an electric furnace.

Example 9

A closed type reaction vessel was charged with 14 L of water, and an inside of the reaction vessel was maintained at 50° C. while flowing a nitrogen gas therethrough. Further, an Ni sulfate-, Co sulfate- and Mn sulfate-containing mixed aqueous solution and a mixed aqueous solution of sodium hydroxide and sodium silicate were successively added into the reaction vessel while stirring such that the pH value therein was adjusted to 9.6 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium hydroxide particles were weighed and intimately mixed with each other. The resulting mixture was calcined at 550° C. for 25 hr under an oxygen flow using an electric furnace.

Example 10

A closed type reaction vessel was charged with 14 L of water, and an inside of the reaction vessel was maintained at 40° C. while flowing a nitrogen gas therethrough. Further, an Ni sulfate-, Co sulfate-, Mn sulfate and Zr sulfate-containing mixed aqueous solution and a mixed aqueous solution of sodium hydroxide and ammonia were successively added into the reaction vessel while stirring such that the pH value therein was adjusted to 9.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 930° C. for 5 hr under an air flow using an electric furnace.

Example 11

A closed type reaction vessel was charged with 14 L of water, and an inside of the reaction vessel was maintained at 70° C. while flowing a nitrogen gas therethrough. Further, an Ni nitrate-, Co nitrate-, Mn nitrate and Y nitrate-containing mixed aqueous solution and a sodium carbonate aqueous solution were successively added into the reaction vessel while stirring such that the pH value therein was adjusted to 8.6 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium nitrate particles were weighed and intimately mixed with each other. The resulting mixture was calcined at 850° C. for 10 hr under an air flow using an electric furnace.

Example 12

A closed type reaction vessel was charged with 14 L of water, and an inside of the reaction vessel was maintained at 30° C. while flowing a nitrogen gas therethrough. Further, an Ni chloride-, Co chloride-, Mn chloride and Zr chloride-containing mixed aqueous solution and a lithium hydroxide aqueous solution were successively added into the reaction vessel while stirring such that the pH value therein was adjusted to 11.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 850° C. for 5 hr under an air flow using an electric furnace.

Example 13

A closed type reaction vessel was charged with 14 L of water, and an inside of the reaction vessel was maintained at 50° C. while flowing a nitrogen gas therethrough. Further, an Ni sulfate-, Co sulfate-, Mn sulfate and Y sulfate-containing mixed aqueous solution and a mixed aqueous solution of sodium carbonate and sodium silicate were successively added into the reaction vessel while stirring such that the pH value therein was adjusted to 8.5 (±0.2). During the reaction, the slurry was discharged out of the reaction system through an overflow line. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 1250° C. for 5 hr under an air flow using an electric furnace, thereby obtaining positive electrode active substance particles.

Example 14

A closed type reaction vessel was charged with 14 L of water, and an inside of the reaction vessel was maintained at 40° C. while flowing a nitrogen gas therethrough. Further, an Ni sulfate-, Co sulfate-, Mn sulfate and Zr sulfate-containing mixed aqueous solution and a mixed aqueous solution of sodium hydroxide, sodium silicate and ammonia were successively added into the reaction vessel while stirring such that the pH value therein was adjusted to 9.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 900° C. for 5 hr under an air flow using an electric furnace.

Example 15

A closed type reaction vessel was charged with 14 L of water, and an inside of the reaction vessel was maintained at 50° C. while flowing a nitrogen gas therethrough. Further, an Ni sulfate- and Mn sulfate-containing mixed aqueous solution and a mixed aqueous solution of sodium carbonate and sodium silicate were successively added into the reaction vessel while stirring such that the pH value therein was adjusted to 9.1 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 830° C. for 10 hr under an air flow using an electric furnace, thereby obtaining positive electrode active substance particles.

Example 16

A closed type reaction vessel was charged with 14 L of water, and an inside of the reaction vessel was maintained at 45° C. while flowing a nitrogen gas therethrough. Further, an Ni sulfate- and Mn sulfate-containing mixed aqueous solution and a mixed aqueous solution of sodium hydroxide, sodium silicate and ammonia were successively added into the reaction vessel while stirring such that the pH value therein was adjusted to 9.9 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 850° C. for 5 hr under an air flow using an electric furnace, thereby obtaining positive electrode active substance particles.

Example 17

A closed type reaction vessel was charged with 14 L of water, and an inside of the reaction vessel was maintained at 50° C. while flowing a nitrogen gas therethrough. Further, a Co sulfate- and Mn sulfate-containing mixed aqueous solution and a mixed aqueous solution of sodium carbonate and sodium silicate were successively added into the reaction vessel while stirring such that the pH value therein was adjusted to 8.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 800° C. for 10 hr under an air flow using an electric furnace, thereby obtaining positive electrode active substance particles.

Comparative Example 1

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium carbonate, sodium silicate and ammonia were successively added into the reaction vessel while stirring such that the pH value therein was adjusted to 9.0 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 600° C. for 25 hr under an air flow using an electric furnace, thereby obtaining positive electrode active substance particles.

Comparative Example 2

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium hydroxide and ammonia were successively added into the reaction vessel while stirring such that the pH value therein was adjusted to 11.7 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 1250° C. for 5 hr under an air flow using an electric furnace.

Comparative Example 3

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium carbonate and ammonia were successively added into the reaction vessel while stirring such that the pH value therein was adjusted to 8.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium hydroxide particles were weighed and intimately mixed with each other. The resulting mixture was calcined at 1030° C. for 5 hr under an air flow using an electric furnace, thereby obtaining positive electrode active substance particles.

Comparative Example 4

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium hydroxide, sodium silicate and ammonia were successively added into the reaction vessel while stirring such that the pH value therein was adjusted to 11.4 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 1030° C. for 5 hr under an air flow using an electric furnace.

Comparative Example 5

A closed type reaction vessel was charged with 14 L of water, and an inside of the reaction vessel was maintained at 10° C. while flowing a nitrogen gas therethrough. Further, an Ni sulfate-, Co sulfate- and Mn sulfate-containing mixed aqueous solution and a mixed aqueous solution of sodium hydroxide and sodium silicate were successively added into the reaction vessel while stirring such that the pH value therein was adjusted to 12.5 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 900° C. for 5 hr under an oxygen flow using an electric furnace.

Reference Example 1 and Comparative Example 6

A closed type reaction vessel was charged with 14 L of water, and an inside of the reaction vessel was maintained at 50° C. while flowing a nitrogen gas therethrough. Further, an Ni sulfate-, Co sulfate- and Mn sulfate-containing mixed aqueous solution and a mixed aqueous solution of sodium carbonate, sodium silicate and ammonia were successively added into the reaction vessel while stirring such that the pH value therein was adjusted to 8.8 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium hydroxide particles were weighed and intimately mixed with each other. The resulting mixture was calcined at 430° C. for 25 hr under an air flow using an electric furnace, thereby obtaining positive electrode active substance particles.

In this Example, although the precursor particles corresponding to those of Invention 6 were used therein (Reference Example 1), the calcination temperature used therein failed to satisfy the requirement defined in Invention 7, and the resulting positive electrode active substance particles failed to satisfy the requirement defined in Invention 1 (Comparative Example 6).

Comparative Example 7

A closed type reaction vessel was charged with 14 L of water, and an inside of the reaction vessel was maintained at 40° C. while flowing a nitrogen gas therethrough. Further, an Ni sulfate-, Co sulfate-, Mn sulfate and Zr sulfate-containing mixed aqueous solution and a mixed aqueous solution of sodium hydroxide and ammonia were successively added into the reaction vessel while stirring such that the pH value therein was adjusted to 9.8 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 750° C. for 10 hr under an air flow using an electric furnace.

Comparative Example 8

A closed type reaction vessel was charged with 14 L of water, and an inside of the reaction vessel was maintained at 60° C. while flowing a nitrogen gas therethrough. Further, an Ni sulfate-, Co sulfate- and Mn sulfate-containing mixed aqueous solution and a mixed aqueous solution of sodium carbonate and ammonia were successively added into the reaction vessel while stirring such that the pH value therein was adjusted to 8.0 (±0.2). During the reaction, the slurry was discharged out of the reaction system through an overflow line. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and silicon oxide were weighed and intimately mixed with each other. The resulting mixture was calcined at 900° C. for 5 hr under an air flow using an electric furnace, thereby obtaining positive electrode active substance particles.

Comparative Example 9

A closed type reaction vessel was charged with 14 L of water, and an inside of the reaction vessel was maintained at 40° C. while flowing a nitrogen gas therethrough. Further, an Ni sulfate-, Co sulfate- and Mn sulfate-containing mixed aqueous solution and a mixed aqueous solution of sodium carbonate and ammonia were successively added into the reaction vessel while stirring such that the pH value therein was adjusted to 8.8 (±0.2). During the reaction, a filtrate only was discharged out of the reaction system using a concentration device, whereas a solid component separated from the filtrate was retained in the reaction vessel. After completion of the reaction, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium carbonate particles were weighed and intimately mixed with each other. The resulting mixture was calcined at 700° C. for 5 hr under an air flow using an electric furnace, thereby obtaining positive electrode active substance particles.

Various properties of the precursor particles obtained in Examples 1 to 17 and Comparative Examples 1 to 9 are shown in Table 1, various properties of the positive electrode active substance particles obtained therefrom are shown in Table 2, and various properties of batteries produced using the positive electrode active substance particles are shown in Table 3.

TABLE 1

| | Properties of precursor particles | | |
|---|---|---|---|
| Examples and Comparative Examples | Ni/(Ni + Co + Mn) (mol/mol (%)) | Co/(Ni + Co + Mn) (mol/mol (%)) | Mn/(Ni + Co + Mn) (mol/mol (%)) |
| Example 1 | 18.7 | 12.4 | 68.9 |
| Example 2 | 21.3 | 11.6 | 67.0 |
| Example 3 | 19.2 | 12.4 | 68.4 |
| Example 4 | 23.0 | 14.4 | 62.5 |
| Example 5 | 21.1 | 14.5 | 64.4 |
| Example 6 | 18.5 | 12.4 | 69.2 |
| Example 7 | 22.7 | 8.2 | 69.2 |
| Example 8 | 20.7 | 21.1 | 58.2 |
| Example 9 | 26.3 | 2.9 | 70.9 |
| Example 10 | 19.1 | 12.2 | 68.7 |
| Example 11 | 39.4 | 0.0 | 60.6 |
| Example 12 | 2.9 | 39.7 | 57.3 |
| Example 13 | 21.5 | 7.2 | 71.3 |
| Example 14 | 19.3 | 13.0 | 67.7 |
| Example 15 | 23.6 | 0.0 | 76.4 |
| Example 16 | 24.4 | 0.0 | 75.6 |
| Example 17 | 0.0 | 32.2 | 67.8 |
| Comparative Example 1 | 19.0 | 10.2 | 70.8 |
| Comparative Example 2 | 18.8 | 12.1 | 69.0 |
| Comparative Example 3 | 21.4 | 10.9 | 67.7 |
| Comparative Example 4 | 50.0 | 20.7 | 29.3 |
| Comparative Example 5 | 7.8 | 8.6 | 83.6 |
| Reference Example 1/ Comparative Example 6 | 20.4 | 10.8 | 68.7 |
| Comparative Example 7 | 17.6 | 8.5 | 73.9 |
| Comparative Example 8 | 11.2 | 19.6 | 69.1 |
| Comparative Example 9 | 21.0 | 11.4 | 67.5 |

| | Properties of precursor particles | | |
|---|---|---|---|
| Examples and Comparative Examples | Si (wt %) | Zr (wt %) | Y (wt %) |
| Example 1 | 0.152 | 0.000 | 0.000 |
| Example 2 | 0.228 | 0.000 | 0.000 |
| Example 3 | 0.142 | 0.000 | 0.000 |
| Example 4 | 0.824 | 0.000 | 0.000 |
| Example 5 | 0.099 | 0.000 | 0.000 |
| Example 6 | 0.033 | 0.000 | 0.000 |
| Example 7 | 0.038 | 0.000 | 0.000 |
| Example 8 | 2.156 | 0.000 | 0.000 |
| Example 9 | 4.259 | 0.000 | 0.000 |
| Example 10 | 0.000 | 0.267 | 0.000 |
| Example 11 | 0.000 | 0.000 | 0.239 |
| Example 12 | 0.000 | 0.000 | 0.038 |

TABLE 1-continued

| Examples | | | |
|---|---|---|---|
| Example 13 | 0.002 | 0.000 | 0.031 |
| Example 14 | 0.003 | 0.029 | 0.000 |
| Example 15 | 0.103 | 0.000 | 0.000 |
| Example 16 | 0.138 | 0.000 | 0.000 |
| Example 17 | 0.169 | 0.000 | 0.000 |
| Comparative Example 1 | 9.362 | 0.000 | 0.000 |
| Comparative Example 2 | 0.000 | 0.000 | 0.000 |
| Comparative Example 3 | 0.000 | 0.000 | 0.000 |
| Comparative Example 4 | 0.134 | 0.000 | 0.000 |
| Comparative Example 5 | 3.542 | 0.000 | 0.000 |
| Reference Example 1/ Comparative Example 6 | 0.397 | 0.000 | 0.000 |
| Comparative Example 7 | 0.000 | 8.657 | 0.000 |
| Comparative Example 8 | 0.128 | 0.000 | 0.000 |
| Comparative Example 9 | 0.000 | 0.000 | 0.000 |

| | Properties of precursor particles | | Heat treatment conditions | |
|---|---|---|---|---|
| Examples and Comparative Examples | Si + Zr + Y (wt %) | Secondary particle diameter (μm) | Calcination temperature (° C.) | Gas atmosphere |
| Example 1 | 0.152 | 12.7 | 880 | Air |
| Example 2 | 0.228 | 17.9 | 950 | Air |
| Example 3 | 0.142 | 5.6 | 900 | Air |
| Example 4 | 0.824 | 6.7 | 780 | Air |
| Example 5 | 0.099 | 21.8 | 1080 | Air |
| Example 6 | 0.033 | 14.7 | 850 | Air |
| Example 7 | 0.038 | 3.6 | 880 | Air |
| Example 8 | 2.156 | 2.5 | 700 | Air |
| Example 9 | 4.259 | 2.1 | 550 | Oxygen |
| Example 10 | 0.267 | 5.8 | 930 | Air |
| Example 11 | 0.239 | 27.1 | 850 | Air |
| Example 12 | 0.038 | 1.2 | 850 | Air |
| Example 13 | 0.033 | 33.6 | 1250 | Air |
| Example 14 | 0.032 | 6.0 | 900 | Air |
| Example 15 | 0.103 | 12.1 | 830 | Air |
| Example 16 | 0.138 | 3.4 | 850 | Air |
| Example 17 | 0.169 | 12.6 | 800 | Air |
| Comparative Example 1 | 9.362 | 6.1 | 600 | Air |
| Comparative Example 2 | 0.000 | 2.1 | 1250 | Air |
| Comparative Example 3 | 0.000 | 15.7 | 1030 | Air |
| Comparative Example 4 | 0.134 | 11.3 | 1030 | Air |
| Comparative Example 5 | 3.542 | 0.8 | 900 | Oxygen |
| Reference Example 1/ Comparative Example 6 | 0.397 | 8.1 | 430 | Air |
| Comparative Example 7 | 8.675 | 2.4 | 750 | Air |
| Comparative Example 8 | 0.128 | 56.1 | 900 | Air |
| Comparative Example 9 | 0.000 | 13.2 | 700 | Air |

TABLE 2

| | Properties of positive electrode active substance particles | | |
|---|---|---|---|
| Examples and Comparative Examples | Si (wt %) | Zr (wt %) | Y (wt %) |
| Example 1 | 0.179 | 0.000 | 0.000 |
| Example 2 | 0.268 | 0.000 | 0.000 |
| Example 3 | 0.116 | 0.000 | 0.000 |
| Example 4 | 0.965 | 0.000 | 0.000 |
| Example 5 | 0.117 | 0.000 | 0.000 |
| Example 6 | 0.040 | 0.000 | 0.000 |
| Example 7 | 0.032 | 0.000 | 0.000 |
| Example 8 | 1.740 | 0.000 | 0.000 |
| Example 9 | 3.436 | 0.000 | 0.000 |
| Example 10 | 0.000 | 0.215 | 0.000 |
| Example 11 | 0.000 | 0.000 | 0.280 |
| Example 12 | 0.000 | 0.000 | 0.031 |
| Example 13 | 0.003 | 0.000 | 0.036 |
| Example 14 | 0.004 | 0.023 | 0.000 |
| Example 15 | 0.122 | 0.000 | 0.000 |
| Example 16 | 0.113 | 0.000 | 0.000 |
| Example 17 | 0.199 | 0.000 | 0.000 |
| Comparative Example 1 | 10.955 | 0.000 | 0.000 |
| Comparative Example 2 | 0.000 | 0.000 | 0.000 |
| Comparative Example 3 | 0.000 | 0.000 | 0.000 |
| Comparative Example 4 | 0.109 | 0.000 | 0.000 |
| Comparative Example 5 | 2.857 | 0.000 | 0.000 |
| Reference Example 1/ Comparative Example 6 | 0.466 | 0.000 | 0.000 |
| Comparative Example 7 | 0.000 | 6.996 | 0.000 |
| Comparative Example 8 | 0.151 | 0.000 | 0.000 |
| Comparative Example 9 | 0.000 | 0.000 | 0.000 |

| | Properties of positive electrode active substance particles | | |
|---|---|---|---|
| Examples and Comparative Examples | Si + Zr + Y (wt %) | Li/ (Ni + Co + Mn) (mol/mol (%)) | Ni/ (Ni + Co + Mn) (mol/mol (%)) |
| Example 1 | 0.179 | 1.42 | 18.7 |
| Example 2 | 0.268 | 1.34 | 21.3 |
| Example 3 | 0.116 | 1.50 | 19.2 |
| Example 4 | 0.965 | 1.34 | 23.0 |
| Example 5 | 0.117 | 1.57 | 21.1 |
| Example 6 | 0.040 | 1.39 | 18.5 |
| Example 7 | 0.032 | 1.51 | 22.7 |
| Example 8 | 1.740 | 1.64 | 20.7 |
| Example 9 | 3.436 | 1.67 | 26.3 |
| Example 10 | 0.215 | 1.50 | 19.1 |
| Example 11 | 0.280 | 1.27 | 39.4 |
| Example 12 | 0.031 | 1.66 | 2.9 |
| Example 13 | 0.040 | 1.40 | 21.5 |
| Example 14 | 0.027 | 1.49 | 19.3 |
| Example 15 | 0.122 | 1.38 | 23.6 |
| Example 16 | 0.113 | 1.51 | 24.4 |
| Example 17 | 0.199 | 1.35 | 0.0 |
| Comparative Example 1 | 10.955 | 1.38 | 19.0 |
| Comparative Example 2 | 0.000 | 1.52 | 18.8 |
| Comparative Example 3 | 0.000 | 1.35 | 21.4 |
| Comparative Example 4 | 0.109 | 1.04 | 50.0 |
| Comparative Example 5 | 2.857 | 1.83 | 7.8 |

TABLE 2-continued

| Examples and Comparative Examples | Co/ (Ni + Co + Mn) (mol/mol (%)) | Mn/ (Ni + Co + Mn) (mol/mol (%)) | Peak intensity ratio (a)/(b) (-) |
|---|---|---|---|
| Reference Example 1/ Comparative Example 6 | 0.466 | 1.39 | 20.4 |
| Comparative Example 7 | 6.996 | 1.50 | 17.6 |
| Comparative Example 8 | 0.151 | 1.35 | 11.2 |
| Comparative Example 9 | 0.000 | 1.36 | 21.0 |

Properties of positive electrode active substance particles

| Examples and Comparative Examples | Co/ (Ni + Co + Mn) (mol/mol (%)) | Mn/ (Ni + Co + Mn) (mol/mol (%)) | Peak intensity ratio (a)/(b) (-) |
|---|---|---|---|
| Example 1 | 12.4 | 68.9 | 0.066 |
| Example 2 | 11.6 | 67.0 | 0.059 |
| Example 3 | 12.4 | 68.4 | 0.044 |
| Example 4 | 14.4 | 62.5 | 0.022 |
| Example 5 | 14.5 | 64.4 | 0.114 |
| Example 6 | 12.4 | 69.2 | 0.053 |
| Example 7 | 8.2 | 69.2 | 0.036 |
| Example 8 | 21.1 | 58.2 | 0.124 |
| Example 9 | 2.9 | 70.9 | 0.184 |
| Example 10 | 12.2 | 68.7 | 0.046 |
| Example 11 | 0.0 | 60.6 | 0.029 |
| Example 12 | 39.7 | 57.3 | 0.024 |
| Example 13 | 7.2 | 71.3 | 0.067 |
| Example 14 | 13.0 | 67.7 | 0.043 |
| Example 15 | 0.0 | 76.4 | 0.118 |
| Example 16 | 0.0 | 75.6 | 0.069 |
| Example 17 | 32.2 | 67.8 | 0.071 |
| Comparative Example 1 | 10.2 | 70.8 | 0.037 |
| Comparative Example 2 | 12.1 | 69.0 | 0.057 |
| Comparative Example 3 | 10.9 | 67.7 | 0.056 |
| Comparative Example 4 | 20.7 | 29.3 | 0.010 |
| Comparative Example 5 | 8.6 | 83.6 | 0.229 |
| Reference Example 1/ Comparative Example 6 | 10.8 | 68.7 | 0.047 |
| Comparative Example 7 | 8.5 | 73.9 | 0.035 |
| Comparative Example 8 | 19.6 | 69.1 | 0.460 |
| Comparative Example 9 | 11.4 | 67.5 | 0.059 |

Properties of positive electrode active substance particles

| Examples and Comparative Examples | BET ($m^2$/g) | Tap density (g/cc) | Compressed density (g/cc) | Secondary particle diameter (μm) |
|---|---|---|---|---|
| Example 1 | 5.52 | 2.10 | 2.55 | 12.1 |
| Example 2 | 3.14 | 2.23 | 2.67 | 17.0 |
| Example 3 | 3.45 | 1.82 | 2.79 | 5.9 |
| Example 4 | 7.73 | 1.76 | 2.42 | 6.4 |
| Example 5 | 0.91 | 2.33 | 2.84 | 20.7 |
| Example 6 | 5.10 | 2.12 | 2.57 | 14.0 |
| Example 7 | 3.37 | 1.63 | 2.70 | 3.8 |
| Example 8 | 10.49 | 1.24 | 3.13 | 2.7 |
| Example 9 | 15.35 | 0.84 | 2.22 | 2.2 |
| Example 10 | 4.17 | 1.83 | 2.71 | 6.1 |
| Example 11 | 3.92 | 2.36 | 2.60 | 25.7 |
| Example 12 | 3.30 | 0.88 | 2.49 | 1.3 |
| Example 13 | 0.28 | 2.38 | 3.02 | 31.9 |
| Example 14 | 3.10 | 1.80 | 2.72 | 6.4 |
| Example 15 | 2.71 | 1.91 | 2.64 | 11.5 |
| Example 16 | 4.36 | 1.22 | 2.47 | 3.6 |
| Example 17 | 6.48 | 2.08 | 2.55 | 12.0 |
| Comparative Example 1 | 27.40 | 0.72 | 1.94 | 5.8 |
| Comparative Example 2 | 0.15 | 1.73 | 3.17 | 2.2 |
| Comparative Example 3 | 0.71 | 2.05 | 3.13 | 14.9 |
| Comparative Example 4 | 0.09 | 2.53 | 3.38 | 12.0 |
| Comparative Example 5 | 7.90 | 0.57 | 2.14 | 0.8 |
| Reference Example 1/ Comparative Example 6 | 21.96 | 1.74 | 1.97 | 7.7 |
| Comparative Example 7 | 6.44 | 0.70 | 2.36 | 2.5 |
| Comparative Example 8 | 1.63 | 2.47 | 3.03 | 53.3 |
| Comparative Example 9 | 8.97 | 1.73 | 2.13 | 12.5 |

TABLE 3

| Examples and Comparative Examples | 4.6 V Discharge capacity 0.1 C mAh/g | 4.6 V Discharge capacity 1 C mAh/g |
|---|---|---|
| Example 1 | 289 | 246 |
| Example 2 | 281 | 242 |
| Example 3 | 282 | 241 |
| Example 4 | 274 | 235 |
| Example 5 | 270 | 231 |
| Example 6 | 268 | 229 |
| Example 7 | 264 | 227 |
| Example 8 | 252 | 212 |
| Example 9 | 250 | 211 |
| Example 10 | 284 | 243 |
| Example 11 | 251 | 216 |
| Example 12 | 257 | 211 |
| Example 13 | 256 | 217 |
| Example 14 | 271 | 232 |
| Example 15 | 272 | 235 |
| Example 16 | 267 | 226 |
| Example 17 | 259 | 213 |
| Comparative Example 1 | 218 | 116 |
| Comparative Example 2 | 193 | 97 |
| Comparative Example 3 | 230 | 142 |
| Comparative Example 4 | 192 | 149 |
| Comparative Example 5 | 153 | 86 |
| Reference Example 1/ Comparative Example 6 | 137 | 81 |
| Comparative Example 7 | 151 | 97 |
| Comparative Example 8 | 173 | 74 |
| Comparative Example 9 | 254 | 186 |

In any of the positive electrode active substance particles obtained in Examples 1 to 17, the discharge capacity thereof as measured at 0.1 C was not less than 250 mA/g, and the discharge capacity thereof as measured at 1 C was not less than 210 mA/g. Thus, it was confirmed that the positive electrode active substance particles obtained according to the present invention had a large discharge capacity owing to the presence of the crystal structure belonging to a space group of 2 C/m, and further were prevented from suffering from excessive sintering upon calcination thereof owing the element A incorporated therein. Further, the positive electrode active substance particles had appropriate tap density and compressed density and therefore can provide an excellent positive electrode material having a high capacity even at a high discharge rate.

On the other hand, the positive electrode active substance particles as obtained in Comparative Examples which failed to comprise an appropriate amount of the element A, or to which the element A was added after synthesis of the precursor particles were deteriorated in discharge capacity as compared those obtained in Examples. Thus, it was recognized that when an appropriate amount of the element A was allowed to coexist in the particles in a well dispersed state, it was possible to obtain a positive electrode active substance for non-aqueous electrolyte secondary batteries which was excellent in discharge capacity.

Even though the calcination temperature was controlled as in Comparative Example 9 so as to allow a tap density and a compressed density of the resulting particles to fall within the ranges defined by the present invention, the resulting positive electrode active substance was deficient in discharge capacity at 1 C owing to a poor crystallinity thereof.

From the above results, it is confirmed that the positive electrode active substance particles according to the present invention are useful as a positive electrode active substance for non-aqueous electrolyte secondary batteries which is excellent in charge/discharge capacities.

INDUSTRIAL APPLICABILITY

The positive electrode active substance particles according to the present invention are largely improved in charge/discharge capacities, and therefore can be suitably used as positive electrode active substance particles for non-aqueous electrolyte secondary batteries.

The invention claimed is:

1. Positive electrode active substance particles comprising a compound having at least a crystal system belonging to a space group of R-3m and a crystal system belonging to a space group of C2/m,
the compound being in the form of a composite oxide comprising at least Li, Mn, an element A, and Co and/or Ni, wherein element A is at least one element selected from the group consisting of Si, Zr and Y;
a relative intensity ratio [(a)/(b)] of a maximum diffraction peak intensity (a) observed at $2\theta=20.8\pm1°$ in a powder X-ray diffraction pattern of the positive electrode active substance particles as measured using a Cu—K$\alpha$ ray to a maximum diffraction peak intensity (b) observed at $2\theta=18.6\pm1°$ in the powder X-ray diffraction pattern being 0.02 to 0.2;
a content of Mn in the positive electrode active substance particles being a molar ratio of Mn/(Ni+Co+Mn) therein is not less than 0.55; and
the positive electrode active substance particles comprising the element A in an amount of 0.03 to 5% by weight and having a tap density of 1.63 to 2.4 g/cc and a compressed density of 2.0 to 3.1 g/cc,
wherein a molar ratio of Li/(Ni+Co+Mn) in the positive electrode active substance particles is 1.25 to 1.7.

2. The positive electrode active substance particles according to claim 1, wherein the positive electrode active substance particles comprise $LiM_xMn_{1-x}O_2$ wherein M is Ni and/or Co; $0<x\leq1$, as the compound having a crystal system belonging to a space group of R-3m, and $Li_2M'_{(1-y)}Mn_yO_3$ wherein M' is Ni and/or Co; $0<y\leq1$, as the compound having a crystal system belonging to a space group of C2/m.

3. The positive electrode active substance particles according to claim 1, wherein the positive electrode active substance particles have a specific surface area of 0.1 to 20 $m^2/g$ as measured by a BET method.

4. The positive electrode active substance particles according to claim 1, wherein the positive electrode active substance particles are in the form of secondary particles produced by aggregating primary particles thereof in which the secondary particles have an average secondary particle diameter of 1 to 50 μm.

5. Precursor particles to the positive electrode active substance particles according to claim 1, the precursor particles comprising a composite hydroxide or a composite carbonate as a main component which comprises at least Mn, an element A, and Co and/or Ni, wherein element A is at least one element selected from the group consisting of Si, Zr and Y,
a content of Mn in the precursor particles being a molar ratio of Mn/(Ni+Co+Mn) therein is not less than 0.55; and the precursor particles comprising the element A in an amount of 0.025 to 5.5% by weight and having an average secondary particle diameter of 1 to 50 μm.

6. A process for producing the positive electrode active substance particles as claimed in claim 1, comprising the step of calcining a mixture comprising the precursor particles, and a lithium compound at a temperature of 500 to 1500° C.

7. A non-aqueous electrolyte secondary battery using a positive electrode comprising the positive electrode active substance particles as claimed in claim 1.

8. The positive electrode active substance particles according to claim 1, wherein a content of Mn in the positive electrode active substance particles being controlled such that a molar ratio of Mn/(Ni+Co+Mn) therein is not less than 0.573.

9. The positive electrode active substance particles according to claim 1, wherein the tap density is 1.76 to 2.4 g/cc.

10. Positive electrode active substance particles consisting of a compound having at least a crystal system belonging to a space group of R-3m and a crystal system belonging to a space group of C2/m,
the compound being in the form of a composite oxide consisting of Li, Mn, an element A, oxygen and Co and/or Ni, wherein element A is at least one element selected from the group consisting of Si, Zr and Y;
a relative intensity ratio [(a)/(b)] of a maximum diffraction peak intensity (a) observed at $2\theta=20.8\pm1°$ in a powder X-ray diffraction pattern of the positive electrode active substance particles as measured using a Cu—K$\alpha$ ray to a maximum diffraction peak intensity (b) observed at $2\theta=18.6\pm1°$ in the powder X-ray diffraction pattern being 0.02 to 0.2;
a content of Mn in the positive electrode active substance particles being controlled such that a molar ratio of Mn/(Ni+Co+Mn) therein is not less than 0.55; and
the positive electrode active substance particles comprising the element A in an amount of 0.03 to 5% by weight and having a tap density of 1.63 to 2.4 g/cc and a compressed density of 2.0 to 3.1 g/cc,
wherein a molar ratio of Li/(Ni+Co+Mn) in the positive electrode active substance particles is 1.25 to 1.7.

11. The positive electrode active substance particles according to claim 10, wherein the tap density is 1.76 to 2.4 g/cc.

\* \* \* \* \*